W. H. KEYS.
PACKING RING.
APPLICATION FILED JUNE 1, 1915.
1,173,810. Patented Feb. 29, 1916.
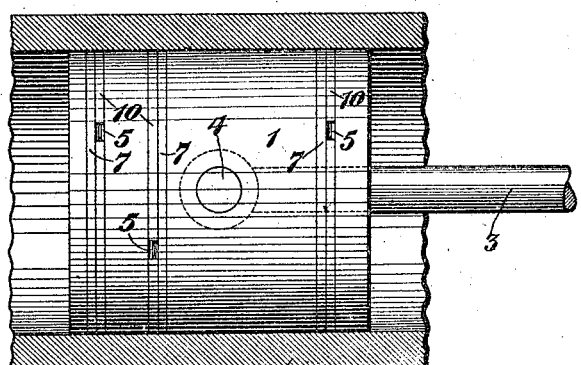
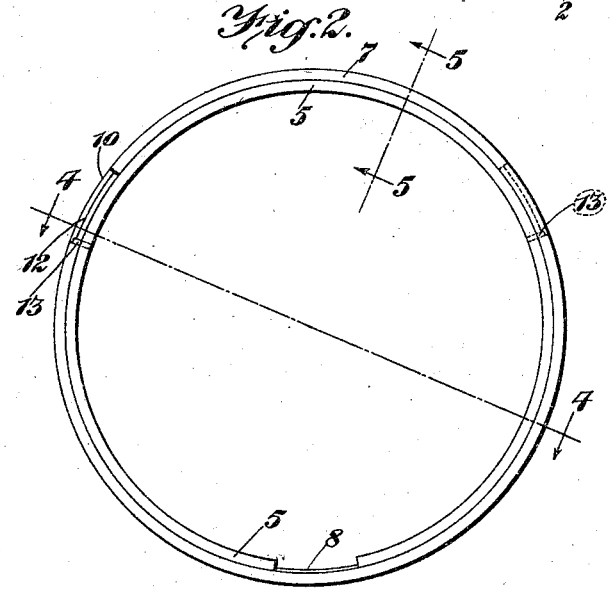
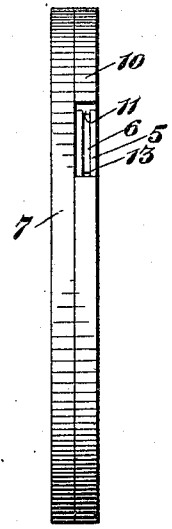
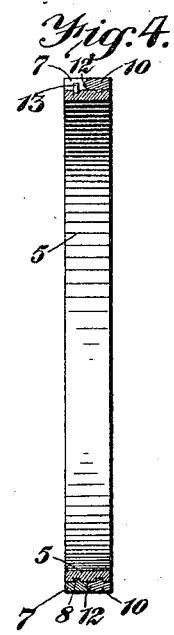
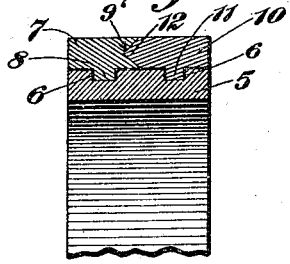
Attest:
Charles A. Becker.
N. G. Butler.
Inventor
William H. Keys
by Pippy & Kingsland
His Attorneys.

UNITED STATES PATENT OFFICE.

WILLIAM H. KEYS, OF ST. LOUIS, MISSOURI.

PACKING-RING.

1,173,810.  Specification of Letters Patent.  Patented Feb. 29, 1916.

Application filed June 1, 1915. Serial No. 31,443.

*To all whom it may concern:*

Be it known that I, WILLIAM H. KEYS, a citizen of the United States, residing at the city of St. Louis and State of Missouri, have invented a new and useful Packing-Ring, of which the following is a specification.

This invention relates to packing rings for reciprocating pistons.

An object of the invention is to provide an improved packing ring consisting of an inner open resilient ring having circumferential grooves formed in the periphery thereof, in combination with two open resilient rings encircling the inner ring and having internal flanges seated in said grooves and bearing against the bottom walls of said grooves, so that the inner ring imparts outward pressure against said flanges which support the outer rings in such position with respect to the inner ring that binding or sticking of the outer rings in connection with the inner ring is prevented.

Another object of the invention is to provide an improved packing comprising an inner ring provided with circumferential grooves, in combination with two outer rings provided with internal flanges seated in said grooves and being of less width than said grooves, so that spaces or passages are provided, thus enabling the flanges to support the outer rings and to permit free relative expanding movement of the outer rings to conform with the varying surfaces of the interior of the cylinder, and interlocking connections between the outer rings, whereby they are retained in substantially the same annular plane.

In the accompanying drawing, wherein I have illustrated a preferred embodiment of the invention, Figure 1 is a view of a piston illustrating a number of the packing rings mounted thereon. Fig. 2 is an elevation of the ring. Fig. 3 is an elevation looking toward the periphery of the ring. Fig. 4 is a sectional view of the ring approximately on the line 4—4 of Fig. 2. Fig. 5 is an enlarged sectional view on the line 5—5 of Fig. 2.

The piston 1 is of the usual reciprocating type which operates within the cylinder 2. The piston-rod 3 is pivoted to the piston at 4 and serves is transmit the power of the piston to the drum mechanism. This piston is provided with the usual number of circumferential grooves formed in proper position to receive the packing rings.

Each packing consists of an inner open resilient ring 5 adapted to be seated in any one of the circumferential grooves formed in the piston, and having its side edges adapted to coöperate with the side walls of the groove without binding or sticking, so that the full power of the resiliency of the ring will be free to impart outward pressure against the encircling outer rings throughout the operation of the piston. The ring 5 is provided with two circumferential grooves 6 which receive flanges formed on the outer rings.

Both of the outer rings are of the open resilient type, the ring 7 having an internal flange 8 which seats in one of the grooves 6, thereby holding the ring 7 in position around the ring 5 and preventing lateral displacement of either of said rings with respect to the other. The ring 7 is thus retained around the ring 5 so that the side edges of the rings 5 and 7 are in the same plane. It will be observed that the flange 8 is of somewhat narrower width than the groove 6 in which it is seated, so as to permit slight relative movement of the outer ring 7 with respect to the inner ring. The formation of the flange 8 of narrower width than the groove 6 within which the flange is seated, provides sufficient space at each side of said flange to prevent binding of the outer ring in connection with the inner ring under varying conditions of heat, and said space also constitutes passages for a lubricant. The flange 8 is also of sufficient depth to support the periphery of the ring 7 free from the periphery of the ring 5, as will be understood by reference to Fig. 5, thus enabling the lubricant to pass between the ring 7 and the inner ring 5 to assure free resilient action by both rings in all parts of the cylinder.

The ring 7 has a V-shaped groove 9 formed in its inner side wall, and the walls of said groove constitute oblique cam surfaces extending from the bottom of the groove to the inner and outer peripheries of the ring. These oblique cam surfaces coöperate with the adjacent outer ring as hereinafter explained. The outer ring 10 is also of open resilient type and is formed with an internal flange 11 which engages within one of the grooves 6. The flange 11 is of less width than the groove 6 in which said flange is seated, so that there is left a slight space at each side of said flange, thus preventing binding or sticking of the ring 10 in connection with the ring 5 under the varying conditions of heat to which the rings are subjected when in use.

The spaces at the side of the flange 11 constitute also passages for a lubricant which may enter the groove 6 on both sides of the flange and pass entirely around the inner ring, thus constantly assuring free resilient action of the outer ring 10 with respect to the inner ring. The flange 11 bears against the bottom wall of the groove 6 in the same manner that the flange 8 bears against the bottom wall of the other groove 6. In this manner the expanding pressure of the inner ring is imparted to both of the outer rings through the medium of the flanges 8 and 11 which support the outer rings 7 and 10 free from the periphery of the inner ring 5 to enable the passage of a lubricant between the outer and inner rings and to prevent binding or adhesion of the rings.

The inner edge of the ring 10 is formed with a V-shaped cam portion 12 which engages within the groove 9. The oblique walls of the cam portion 12 coöperate with the oblique walls of the groove 9, so that the expanding resiliency of each of the outer rings imparts pressure to the other outer ring, thus obtaining full efficiency of the resiliency of the outer rings and also of the inner ring because of the pressure imparted to the outer rings through the medium of the flanges 8 and 11.

The combined width of the two outer rings is equal to the width of the inner ring, but the outer rings are permitted slight movement with respect to each other and with respect to the inner ring, because of the fact that the flanges 8 and 11 are somewhat narrower than the grooves 6 within which said flanges are engaged. Also the formation of the flanges 8 and 11 upon the outer rings increases the resilient power of said rings and at the same time enables them to receive the entire pressure of the inner ring, whereas the reverse construction involving the provision of grooves in the outer rings not only reduces the resilient strength of the rings, but also reduces the thickness of the rings so that the total value thereof is materially reduced.

The rings are assembled so that the open ends of the outer rings are remote from each other and from the open ends of the inner ring, thereby enabling the adjacent portion of each ring to close the open space between the ends of the adjacent ring.

Rotation of the outer rings with respect to each other and with respect to the inner ring is limited by projections 13 rigid with the inner ring and extending between the ends of the outer rings and constituting abutments therefor.

What I claim and desire to secure by Letters Patent of the United States is:—

1. In a packing, the combination of a resilient open inner ring having two separate circumferential grooves formed in the periphery thereof, and two outer rings encircling said inner ring and having abutting side edges, an internal flange intermediate of the side edges of each ring engaging within one of said grooves and receiving the pressure exerted by the resiliency of said inner ring.

2. A packing, comprising an inner ring having two separate circumferential grooves, two outer rings encircling said inner ring, flanges intermediate of the side edges of said outer rings bearing against the bottom walls of said grooves and supporting said outer rings away from said inner ring and receiving pressure imparted by said inner ring to leave a space between the adjacent peripheries of said outer and inner rings, and coöperating cam surfaces on the adjacent edges of said outer rings.

3. A packing, comprising a resilient open inner ring having two separate circumferential grooves in the periphery thereof, two open resilient outer rings encircling said inner ring, flanges integral with said outer rings intermediate of the side edges thereof bearing against the bottom walls of said grooves, and receiving the pressure imparted by the expanding resiliency of said inner ring and supporting said outer rings free from said inner ring to leave a space between the adjacent peripheries of said outer and inner rings, and interlocking tongue and groove connection between said outer rings.

4. A packing, comprising a resilient open inner ring having two separate parallel circumferential grooves in the periphery thereof, two open resilient outer rings encircling said inner ring, a flange on each of said outer rings intermediate of the side edges thereof seated in one of said grooves and receiving pressure imparted by said inner ring and permitting movement of said outer rings laterally with respect to said inner ring, and means limiting relative rotation of said outer rings and said inner rings.

In witness whereof, I have signed this specification in the presence of two subscribing witnesses.

WILLIAM H. KEYS.

Witnesses:
L. C. KINGSLAND,
BERNIE M. WATSON.